United States Patent [19]
Steeby

[11] Patent Number: 5,406,861
[45] Date of Patent: Apr. 18, 1995

[54] MANUAL MODIFICATION OF AUTOMATIC MODE SHIFT POINTS

[75] Inventor: Jon A. Steeby, Schoolcraft, Mich.

[73] Assignee: Eaton Corporation, Cleveland, Ohio

[21] Appl. No.: 126,843

[22] Filed: Sep. 22, 1993

[51] Int. Cl.⁶ .............................................. F16H 5/42
[52] U.S. Cl. ..................................... 74/336 R; 477/78
[58] Field of Search ........................ 74/336 R; 477/78

[56] References Cited

U.S. PATENT DOCUMENTS

| | | | |
|---|---|---|---|
| 4,361,061 | 11/1982 | Smyth | 74/866 |
| 4,648,290 | 3/1987 | Dunkley et al. | 74/866 |
| 4,991,455 | 2/1991 | Bulgrien | 74/336 R |
| 5,050,079 | 9/1991 | Steeby | 74/336 R |
| 5,053,961 | 10/1991 | Genise | 364/424.1 |
| 5,053,962 | 10/1991 | Genise | 364/424.1 |
| 5,109,721 | 5/1992 | Boardman | 74/858 |
| 5,261,288 | 11/1993 | Menig | 74/336 R |
| 5,315,514 | 5/1994 | Steeby et al. | 74/336 R |
| 5,323,669 | 6/1994 | Steeby et al. | 74/336 R |

*Primary Examiner*—Dirk Wright
*Attorney, Agent, or Firm*—Howard D. Gordon

[57] ABSTRACT

An automated transmission (10) system having a selectable automatic shift initiation mode of operation (D) is provided with manually operated selectors (226/228) for selectively increasing and decreasing the engine speeds (240, 242) at which upshifts and downshifts are implemented in the automatic shift initiation mode of operation.

27 Claims, 5 Drawing Sheets

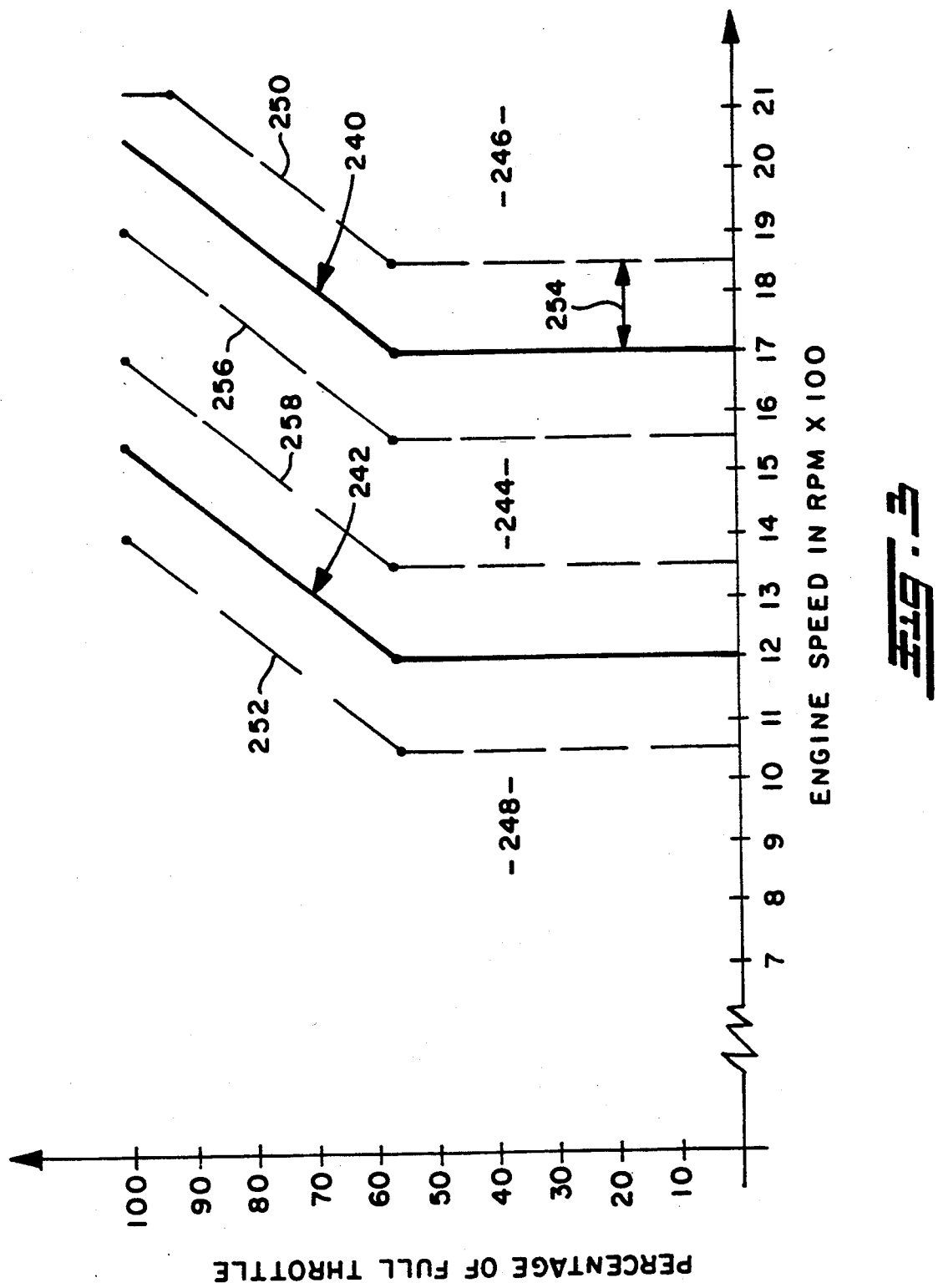

MANUAL MODIFICATION OF AUTOMATIC MODE SHIFT POINTS

BACKGROUND OF THE INVENTION

1. Field of the Invention

The present invention relates to fully or partially automated vehicular transmission systems having at least one mode of operation wherein shifts from a currently engaged gear ratio into an automatically selected target gear ratio are automatically initiated at a selected engine speed for a given set of vehicle operating parameters. In particular, the present invention relates to fully or partially automated transmission systems of the above-described type wherein the vehicle driver can manually modify, within limits, the engine speeds, often referred to as shift points or shift profiles, at which shifts will be automatically initiated in the automatic shift initiation mode.

2. Description of the Prior Art

Fully and partially automated vehicular transmission systems having at least one automatic shift initiation mode wherein shifts from a currently engaged gear ratio into a selected target gear ratio are automatically initiated at a selected engine speed for a given set of vehicle operating conditions are well known in the prior art. Examples of such transmission may be seen by reference to U.S. Pat. Nos. 4,361,060; 4,430,911; 4,648,290; 4,722,248; 5,053,961; 5,053,962 and 5,109,721, the disclosures of all of which are incorporated herein by reference.

In such prior art automated transmission systems, it is known to define a standard or default set of conditions, including engine speed, or a related parameter usually called shift points and/or shift profiles, at which, in the automatic shift implementation mode, and in the absence of preset conditions, a shift will be automatically implemented. It is also known to sense for the presence of such preset conditions, and to automatically modify the shift points/shift profiles by increasing or decreasing the engine speeds at shifts are automatically implemented in response to sensing the presence of such conditions. By way of example, in response to over-travel depression of the throttle pedal (i.e. "kick down"), upshifts may be delayed by increasing the engine speeds at which upshifts are initiated. For another example, to prevent "hunting", for a period of time after a downshift, the engine speeds at which upshifts are initiated may be increased and/or for a period of time after an upshift, the engine speeds at which downshifts are initiated may be decreased.

Examples of such automatic shift point/shift profile modification may be seen by reference to above-mentioned U.S. Pat. No. 4,361,060, and to U.S. Pat. Nos. 4,551,802; 4,569,255 and 4,852,006, the disclosures of which are incorporated herein by reference.

While the prior art fully or partially automated transmission systems did incorporate control strategies for automatically adjusting automatic shift initiation mode shift points in response to sensing the occurrence or presence of certain preset conditions, such systems are not totally satisfactory as such systems, in the automatic shift initiation mode of operation, do not allow the vehicle driver to manually temporarily modify the shift points, within limits, to achieve a then desired vehicle performance.

SUMMARY OF THE INVENTION

In accordance with the present invention, the drawbacks of the prior art are minimized or overcome by the provision of a fully or partially automated vehicular transmission having at least one automatic shift implementation mode of operation wherein the vehicle operator may manually adjust the performance of the transmission system by manually increasing and/or decreasing, within limits, the engine speeds at which shifts from a currently engaged ratio into a selected target ratio will be automatically initiated.

The above is accomplished in a fully or partially automated transmission system by providing the vehicle operator with a mode selector by which the automatic shift initiation mode of operation may be selected and a preference selector, independent of the mode selector, by which the operator can indicate a desire to advance or delay the occurrence of automatically implemented upshifts and downshifts. In a preferred embodiment, the mode selector will allow selection of a manual shift implementation mode of operation, and the preference selector in the manual shift initiation mode of operation will comprise an "up" selector and a "down" selector to allow manual selection of upshifts or downshifts, respectively. In this preferred embodiment, when in the automatic shift initiation mode or operation, an actuation of the "up" selector will signify a driver preference for advanced automatic implementation of upshifting and delayed automatic implementation of downshifting and thus, within limits, the system controller will decrease the engine speeds at which upshifts and downshifts occur. A "down" selection in the automatic shift implementation mode will have the opposite results.

Accordingly, it is an object of the present invention to provide an at least partially automated vehicular transmission system having an automatic shift initiation mode of operation in which the vehicle operator can manually modify the shifts points/shift profiles to selectively advance or delay the automatic initiation of upshifts and downshifts from the currently engaged gear ratio.

This and other objects and advantages of the present invention will become apparent for a reading of the detailed description of the preferred embodiment taken in connection with drawings.

BRIEF DESCRIPTION OF THE DRAWINGS

FIG. 3 is a schematic illustration of typical shift profiles for a heavy duty vehicular automated mechanical transmission.

DESCRIPTION OF THE PREFERRED EMBODIMENT

Certain terminology will be used in the following description for convenience in reference only and will not be limiting, The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to non-rotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

The term "automatic shift initiation" is intended to apply to initiation of fully automatic shifts as seen in above-mentioned U.S. Pat. Nos. 4,361,060 and 5,109,721, to initiation of fully automatic shifts in only selected groupings of ratios as seen in above-mentioned U.S. Pat. No. 4,722,248 and to automatic preselection of a shift and/or issuing of a shift prompt as seen in above-mentioned U.S. Pat. Nos. 5,053,961 and 5,053,962.

Signals indicative of engine speed will include signals from engine speed sensors, signals from input shaft speed sensors, and singles such as output shaft and gear ratio signals which may be used to calculate (ES-=OS*GR) and/or estimate engine speed.

Figure 1:
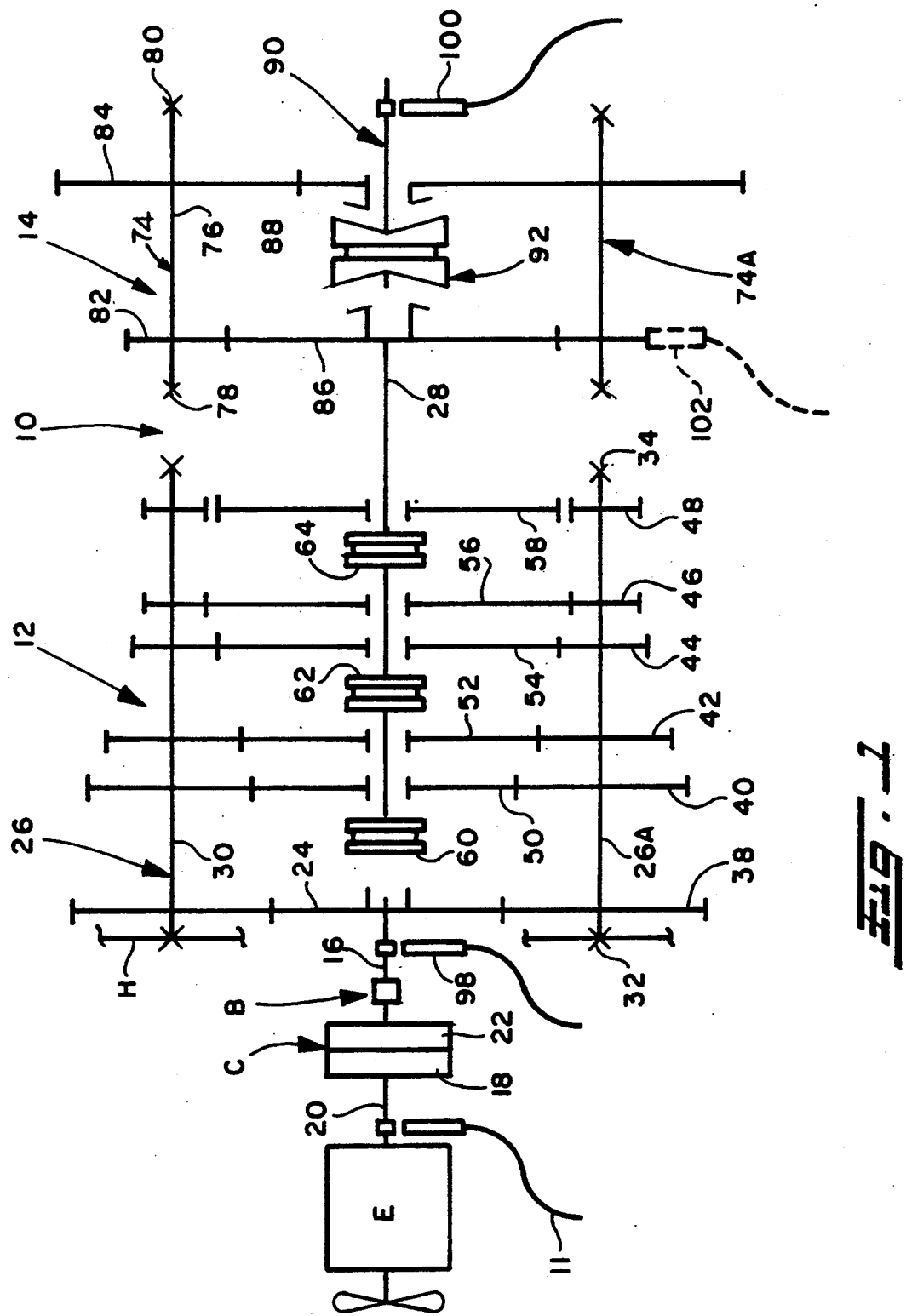
FIG. 1 is a schematic illustration of a partially automated vehicular mechanical transmission system advantageously utilizing the present invention.

Referring to FIG. 1, a range type compound transmission 10 of the type partially automated by the semiautomatic mechanical transmission system of the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually or automatically controlled throttle device (not shown) and the master clutch C is manually controlled by a clutch pedal (not shown) or automatically controlled by a clutch actuator, or the like. An input shaft brake B, usually operated by overtravel of the clutch pedal, is preferably provided to provide quicker upshifting as is well known in the prior art.

Transmissions similar to compound mechanical transmission 10 are well known in the prior art and may be appreciated by reference to U.S. Pat. Nos. 3,105,395; 3,283,613; 4,735,109 and 4,754,665, the disclosures of which are incorporated herein by reference. A sensor 11 may be provided for sensing the rotational speed of the engine and providing a signal indicative thereof.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 may be actuated by electric motors or by compressed fluid, such as compressed air, and is of the type automatically controllable by a control unit as may be seen by reference to U.S. Pat. Nos. 4,445,393; 4,555,959; 4,361,060; 4,676,115; 4,873,881 and 4,899,607, the disclosures of which are incorporated herein by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith. Similar transmissions provide 10, 13, 16 or 18 forward speeds as may be seen by reference to U.S. Pat. Nos. 4,754,665 and 4,974,468.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to simple transmissions and to range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershaft type. Further, the present invention is also applicable to automated transmissions utilizing friction clutches rather than jaw clutches to engage selected ratios.

Figure 2:
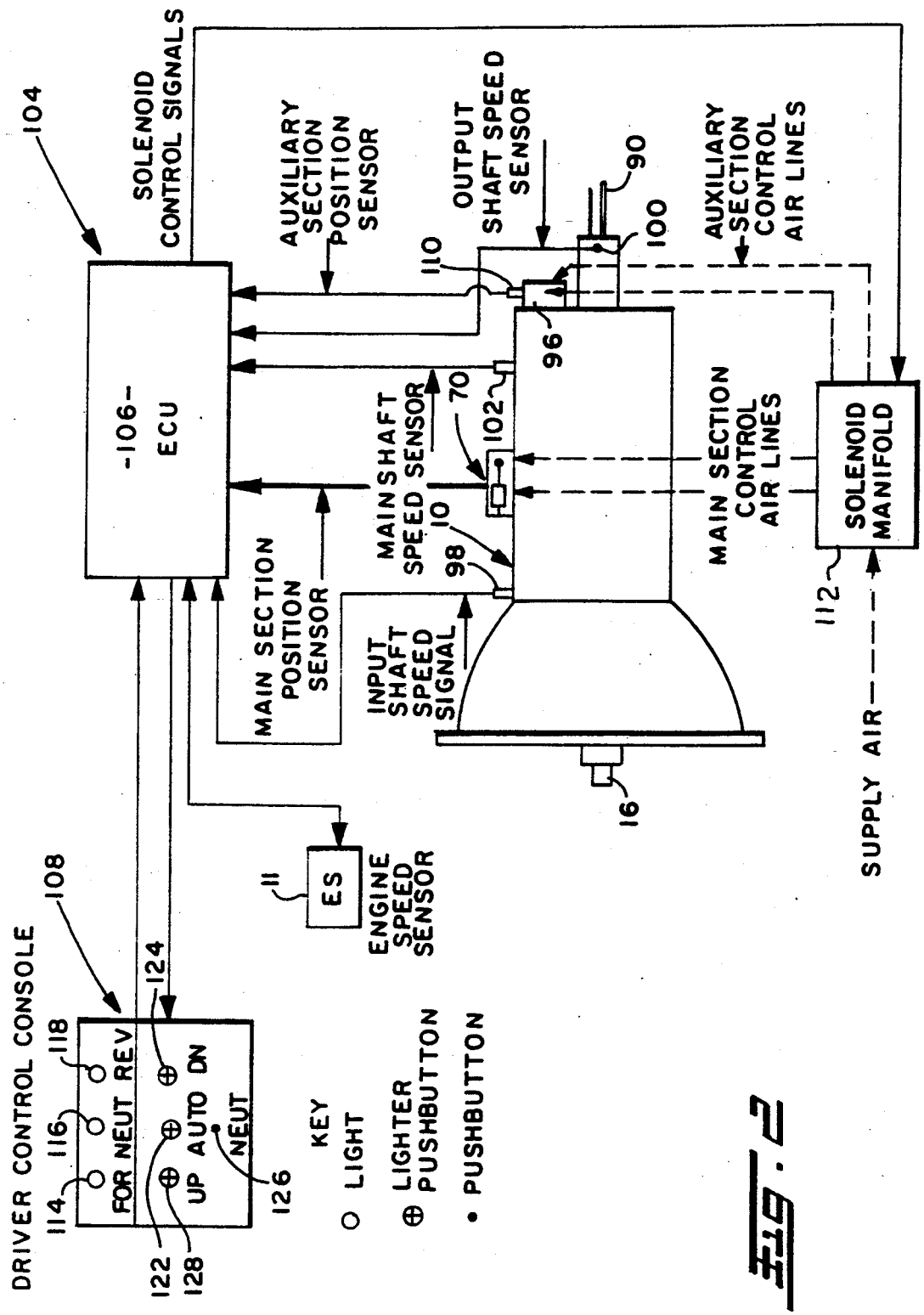
FIG. 2 is a schematic illustration of a partially automatic shift implementation system for a mechanical transmission system advantageously utilizing the present invention.

The semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the engine speed sensor 11, input shaft speed sensor 98, from the output shaft speed sensor 100 (or, alternatively, the mainshaft speed sensor 102) and from the driver control console 108. The ECU 106 may also receive inputs from an auxiliary section position sensor 110.

The ECU is effective to process the inputs in accordance with predetermined logic rules to issue issue command output signals to a transmission operator, such as solenoid manifold 112 which controls the mainsection section actuator 70 and the auxiliary section actuator 96, and to the driver control console 108. ECU's of this type are well known in the prior art as may be seen by reference to U.S. Pat. No. 4,595,986, the disclosure of which is incorporated herein by reference.

The driver control and display console allows the operator to select a manual or hold mode of operation for manually selecting a shift in a given direction (i.e. upshifts or downshifts) or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

Figure 2A:
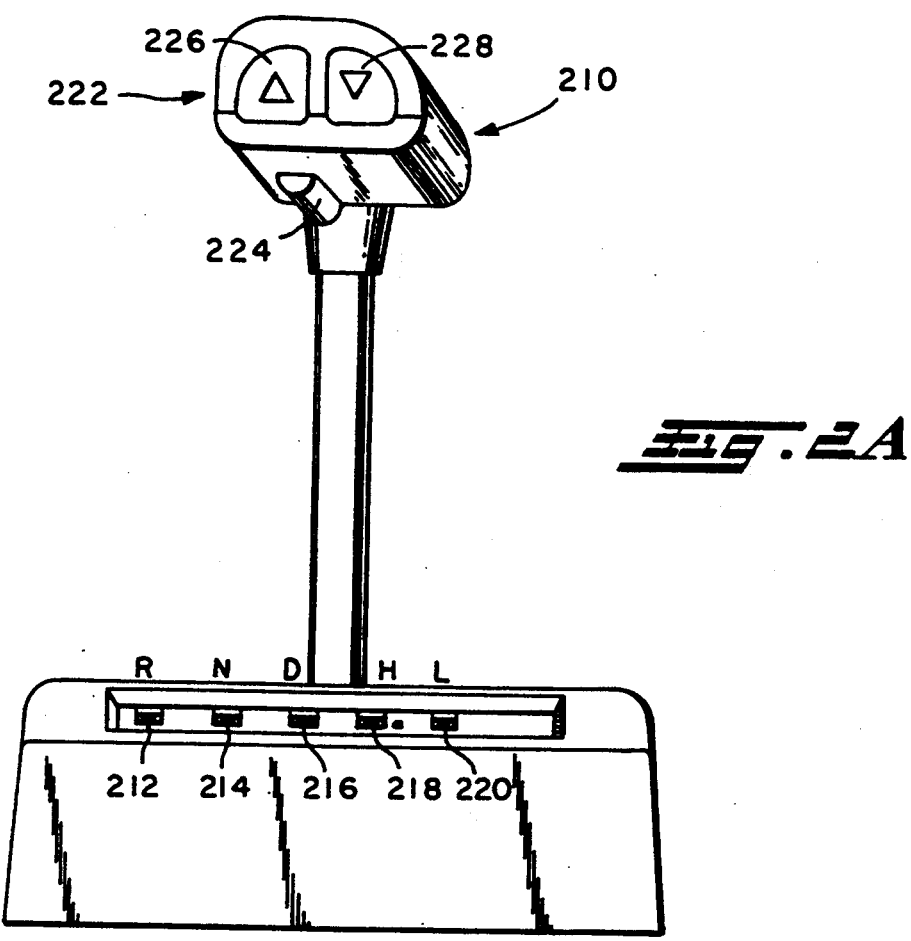
FIG. 2A is an elevational view of an alternate driver control for the automated transmission system of FIG. 2.

An alternate to the control console 108 is illustrated in FIG. 2A. Briefly, a mode selector 210 is utilized to select reverse (R) 212, neutral (N) 214, drive (automatic) (D) 216, hold (manual) (H) 218 and low (L) 220. The mode selector includes a handle 222 having a reverse interlock release button 224 and upshift 226 and downshift 228 selection buttons. The function of mode selector 210 is substantially identical to console 108 described above.

To implement a selected shift, the manifold 112 is preselected to cause actuator 70 to be biased to shift main transmission section 12 into neutral. This is accomplished by the operator causing a torque break or reversal by manually momentarily decreasing and/or increasing the supply of fuel to the engine and/or manually disengaging the master clutch C. As the transmission is shifted into neutral, and neutral is verified by the ECU (neutral sensed for a period of time such as 1.5 seconds), the neutral condition indicia button 116 is lighted. If the selected shift is a compound shift, i.e. a shift of both the main section 12 and of the range section 14, such as a shift from 4th to 5th speeds as seen in FIG. 1 A, the ECU will issue issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator, or a control unit, by throttle manipulation and/or use of the input shaft brake, causes the input shaft speed to fall within the acceptable range, the ECU 106 will issue issue command output signals to manifold 112 to cause actuator 70 to engage the mainsection ratio to be engaged. Preferably, the actuator will respond very quickly not requiring the operator to maintain the input shaft speed within the acceptable range for an extended period of time. To select a shift into transmission neutral, selection button 126 is pushed. Indicating light 116 will flash until the ECU confirms that neutral is obtained at which time the light 116 will assume a continuously lighted condition while the transmission remains in neutral.

In the control algorithms, the issuing of command output signals for engagement of a target gear is dependent upon the transmission (i.e. the input shaft) being manually brought to within an acceptable synchronous point. This synchronous point is usually a range of RPMs (error band) centered about an error of zero RPM (i.e. when input shaft speed equals the product of output shaft speed times the numerical value of the target gear ratio, $IS=OS*GR_T$). When the control electronics sense that the input shaft speed falls within the error band it will fire the solenoid of manifold 112 that will cause the target gear to be engaged. The error bands are selected to give the best shift quality for each gear ratio. These error bands are usually stored in software in the form of tables that are indexed as a function of target gear. When these tables are set up for best shift quality the bands must be made small to minimize "clunking" as the target gear is engaged. With small error bands it is more difficult for the driver to bring the transmission to the correct synchronous point and he may miss it altogether and end up in neutral.

Above-mentioned U.S. Pat. No. 5,063,511 provided a missed shift recovery algorithm that will access a second set of tables a short time after neutral has been sensed (one second). In a normal shift, one second is ample time for the driver to have brought the transmission to the synchronous point. If the neutral state has existed for more than the allowed time the algorithms will assume the driver has missed the shift and call for the new set of tables. This second set of tables will open the error bands to allow for a harsher shift which enhances the probability that the driver's efforts will result in engagement of the target gear instead of remaining in a neutral state.

In the automatic preselection mode of operation, selected by use of lighted pushbutton 122, or by moving selector 210 to the "D" position, the ECU will, based upon stored logic rules, currently engaged ratio (which may be position sensed and/or calculated by comparing input shaft to output shaft speed) and output shaft speed, determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode by depression of pushbutton 122.

As is very well known, in a heavy duty multiple speed mechanical transmission having 9, 10, 12, 13, 16 19 or 20 selectable forward gear ratios (GR), for many vehicle speeds, 3, 4 or 5 of the ratios are permissibly engageable (i.e. at current vehicle speed, and at master clutch (C) lockup, the calculated engins-speed ($ES=G-R*OS$) will be above a minimum value ($ES_{MIN}$) and below a maximum value ($ES_{MAX}$). The minimum value ($ES_{MIN}$) is usually about the stall speed of the engine while the maximum value ($ES_{MAX}$) is slightly below a destructive speed. For a typical vehicular heavy duty diesel engine, the minimum speed is usually about 600 RPM, the maximum speed is about 2200 RPM and the desirable range is about 1300–1600 RPM.

In the automatic or drive mode of operation of system 10, shifts are automatically initiated, in this transmission system embodiment preselected, in accordance with shift profiles as is well known in the prior art. Typical shift profiles are schematically illustrated in FIG. 3 and are usually determined in the ECU 106 by calculation and/or look-up table methods.

Briefly, for a given set of vehicle conditions, such as throttle pedal position, a profile for engine speeds at which upshifts and downshifts should be automatically implemented is generated. Referring to FIG. 3, lines 240 and 242, respectively, represent typical default values for upshift and downshift, respectively, shift profiles. Operation in area 244 between the upshift and downshift profiles requires no action, operation in area 246 to the right of upshift profiles 240 requires initiation of an upshift and operation in area 248 to the left of downshift profile 242 requires initiation of a downshift. As is also well known, to provide an anti-hunting feature, the upshift profile may be temporarily offset to the right after a downshift and/or the downshift profile may be temporarily offset to left after an upshift. Lines 250 and 252, respectively, represent the anti-hunt offset upshift and downshift, respectively, profiles. As may be seen, the offsets 254 may be by 150 or more RPM. Typically, the shift profiles will return to the default values from the offset values thereof upon the passage of time and/or upon obtaining a certain vehicle or engine speed.

The control of the present invention allows the vehicle operator or driver to manually modify vehicle performance, while operating in the automatic or drive mode of transmission system 10 by manually causing the engine speeds at which shifts are automatically initiated to be increased or decreased, within limits.

Assuming off-set profile 252 represents the minimum downshift engine speeds ($ES_{MIN\ DS}$) and off-set profile 250 represents the maximum upshift engine speeds ($ES_{MAX\ US}$), lines 256 and 258, respectively, will represent the minimum upshift engine speeds ($ES_{MIN\ US}$) and maximum downshift engine speeds ($ES_{MAX\ DS}$) of partially automated mechanical transmission 10.

In the drive or automatic shift initiation mode of operation, the vehicle driver may use the upshift and downshift buttons 226 and 228 to adjust vehicle performance. Manual operation of the upshift button 226 while in the drive mode will signal a selection of advanced upshifts, and delayed downshifts, causing the ECU to temporarily decrease the engine speeds ($ES_{US}$ and $ES_{DS}$) at which upshifts and downshifts will be automatically initiated. By way of example, this can result in moving from shift profiles 240 and/or 242 to shift profiles 256 and/or 252 and/or from shift profiles 250 and/or 258 to shift profiles 240 and/or 258 to shift profiles 240 and/or 242. Conversely, manual operation of the downshift button 228 while in the drive mode will signal a driver request for temporarily advanced downshifts and delayed upshifts, causing the ECU to temporarily increase the engine speeds ($ES_{US}$ and $ES_{DS}$) at which upshifts will be automatically initiated. By way of example, this can result in shift from downshift profile 252 or 242 to downshift profile 242 or 258, respectively, and/or from upshift profile 256 or 240 to upshift profile 240 or 250, respectively.

Figure 4A:
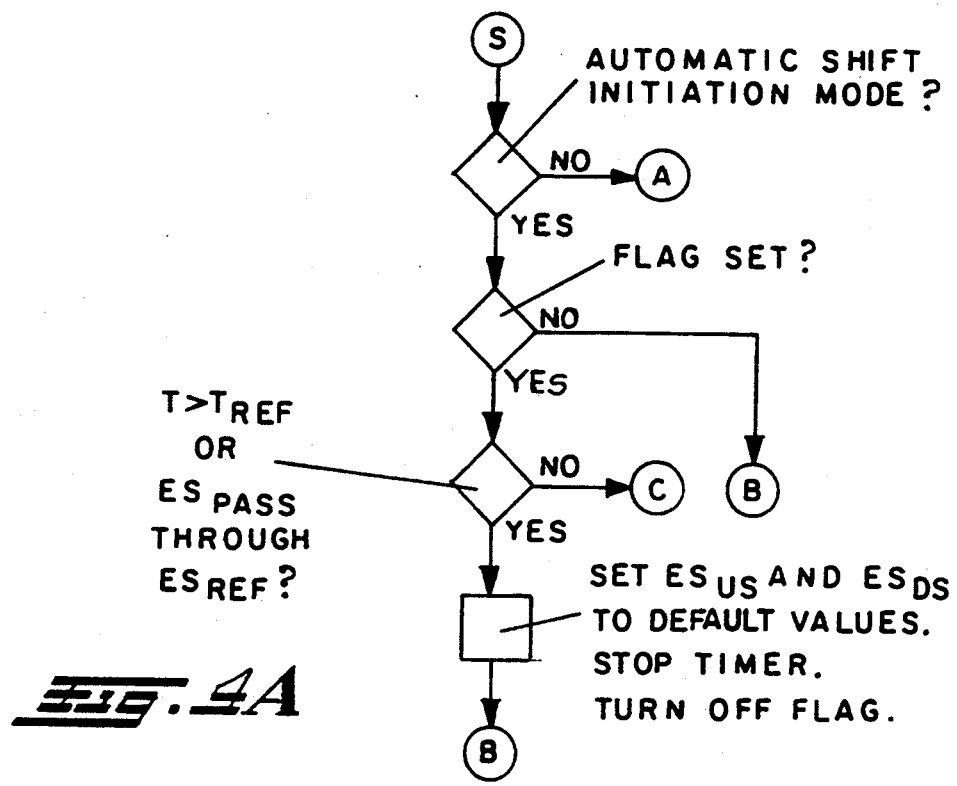
FIGS. 4A and 4B are schematic illustrations, in flowchart format, of the present invention.
Figure 4B:
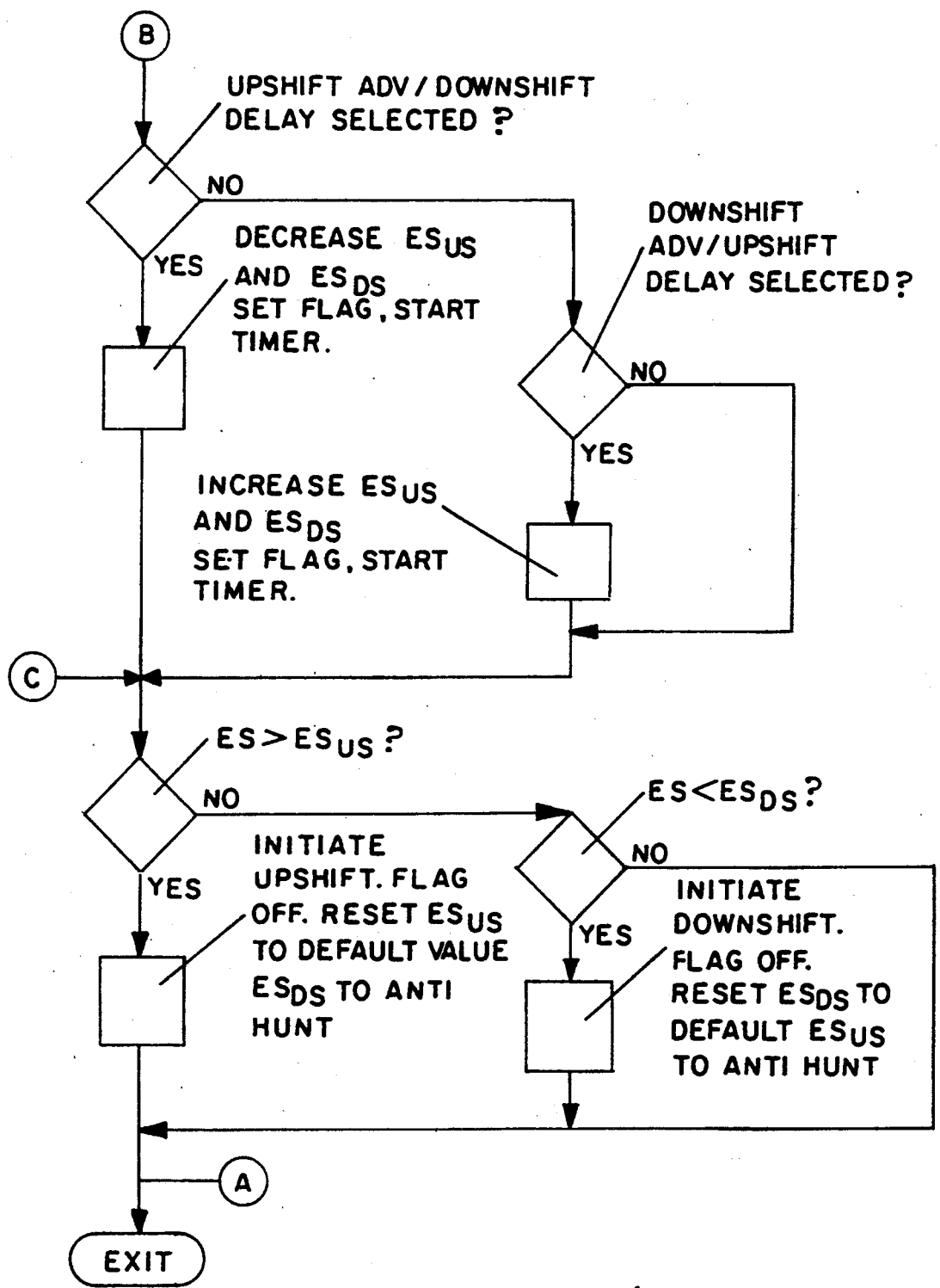

The present invention is illustrated in flowchart format in FIG. 4.

As with the automatic shift profile offsets discussed above, it is preferable that the manually selected shift profile offsets be only temporary and that, after the occurrence of defined preconditions, such as the passage of time, the completion of a shift and/or engine or vehicle speed obtained a reference value, the shift point engine speeds return to the default value (240/242) thereof.

It may be seen that the present invention allows the operator of a vehicle equipped with an automated transmission and operating in an automatic shift initiation mode to temporarily advance or delay automatic shift initiation to modify vehicle performance for then existing conditions. For example, if a vehicle driver sees a steep grade ahead, he may push the "downshift" button 228 to delay automatic upshifts and/or advance automatic downshifts.

Although the present invention has been described with a certain degree of particularity, it is understood that various changes to form and detail may be made without departing from the spirit and the scope of the invention as hereinafter claimed.

I claim:

1. An automated vehicular transmission system comprising a fuel throttle controlled engine (E), a multiple speed change gear transmission (1 0) having an input shaft (16) and an output shaft (90), a nonpositive coupling drivingly interposed between the engine and the transmission input shaft, a first sensor (11/98/100) for providing a first input signal indicative of engine rotation speed (ES/IS/OS*GR), a mode selector (210) for manual selection of transmission operating modes, including a selectable automatic shift initiation mode, and for providing a second input signal indicative of the selected transmission mode, a control unit (106) for receiving said input signals and for processing same according to predetermined logic rules to issue command output signals and actuators (112, 70, 96) responsive to said output signals for controlling shifting of said transmission, said system in the automatic shift initiation mode effective to automatically initiate upshifts if sensed engine speed ($ES_S$) is greater than an upshift engine speed value ($ES_{US}$) and to automatically initiate downshifts if sensed engine speed is less than a downshift engine speed value ($ES_{DS}$), said upshift and downshift engine speed values having maximum ($ES_{MAX\ US}$, $ES_{MAX\ DS}$) and minimum ($ES_{MIN\ US}$ and $ES_{MIN\ US}$) values thereof, said system characterized by:

a first preference selector (226) for manual selection of advanced automatic upshift initiation and for providing a third input signal indicative thereof, said control unit responsive to manual selection of advanced automatic upshift initiation to decrease the value of the upshift engine speed value but not below said minimum value ($ES_{MIN\ US}$) thereof.

2. The system of claim 1 further characterized by a second preference selector (228) for manual selection of advanced automatic downshift initiation and for providing a fourth input signal indicative thereof, said control unit responsive to manual selection of advanced automatic downshift initiation to increase the value of the downshift engine speed value but not above said maximum value ($ES_{MAX\ DS}$) thereof.

3. The system of claims 1 or 2 further characterized by said control unit responsive to manual selection of advanced automatic upshift initiation to also decrease the value of the downshift engine speed value but not below the said minimum value ($ES_{MIN\ DS}$) thereof.

4. The system of claim 2 further characterized by said control unit is responsive to manual selection of advanced automatic upshift initiation to also decrease the value of the downshift engine speed value but not below the said minimum value ($ES_{MIN\ DS}$) thereof and is responsive to manual selection of advanced automatic downshift initiation to also increase the value of the upshift engine speed value but above said maximum value ($ES_{MAX\ US}$) thereof.

5. An automated vehicular transmission system comprising a fuel throttle controlled engine (E), a multiple speed change gear transmission (10) having an input shaft (16) and an output shaft (90), a nonpositive coupling drivingly interposed between the engine and the transmission input shaft, a first sensor (11/98/100) for providing a first input signal indicative of engine rotation speed (ES/IS OS*GR), a mode selector (210) for manual selection of transmission operating modes, including a selectable automatic shift initiation mode, and for providing a second input signal indicative of the selected transmission mode, a central processing unit (106) for receiving said input signals and for processing same according to predetermined logic rules to issue command output signals and actuators (112, 70, 96) responsive to said output signals for controlling shifting of said transmission, said system in the automatic shift initiation mode effective to automatically initiate upshifts if sensed engine speed ($ES_S$) is greater than an upshift engine speed value ($ES_{US}$) and to automatically initiate downshifts if sensed engine speed is less than a downshift engine speed value ($ES_{DS}$), said upshift and downshift engine speed values having maximum ($ES_{MAX\ US}$, $ES_{MAX\ DS}$) and minimum ($ES_{MIN\ US}$ and $ES_{MIN\ DS}$) values thereof, said system characterized by:

a second preference selector (228) for manual selection of advanced automatic downshift initiation and for providing a fourth input signal indicative thereof, said control unit responsive to manual selection of advanced automatic downshift initiation to increase the value of the downshift engine speed value but not below said maximum value ($ES_{MAX\ DS}$) thereof.

6. The system of claim 5 further characterized by said control unit is responsive to manual selection of advanced automatic downshift initiation to also increase the value of the upshift engine speed value but above said maximum value ($ES_{MAX\ DS}$) thereof.

7. An automated vehicular transmission system comprising a fuel throttle controlled engine (E), a multiple speed change gear transmission (10) having an input shaft (16) and an output shaft (90), a nonpositive coupling drivingly interposed between the engine and the transmission input shaft, a first sensor (11/98/100) for providing a first input signal indicative of engine rotation speed (ES/IS OS*GR), a mode selector (210) for manual selection of transmission operating modes, including a selectable automatic shift initiation mode, and for providing a second input signal indicative of the selected transmission mode, a central processing unit (106) for receiving said input signals and for processing same according to predetermined logic rules to issue command output signals and actuators (112, 70, 96) responsive to said output signals for controlling shifting of said transmission, said system in the automatic shift initiation mode effective to automatically initiate upshifts if sensed engine speed ($ES_S$) is greater than an upshift engine speed value ($ES_{US}$) and to automatically initiate downshifts if sensed engine speed is less than a downshift engine speed value ($ES_{DS}$), said upshift and downshift engine speed values having maximum ($ES_{MAX\,US}$, $ES_{MAX\,DS}$) and minimum ($ES_{MIN\,US}$ and $ES_{MIN\,DS}$) values thereof, said system characterized by:

a first preference selector (226) for manual selection of delayed automatic downshift initiation and for providing a third input signal indicative thereof, said control unit responsive to manual selection of delayed automatic downshift initiation to decrease the value of the downshift engine speed value but not below said minimum value ($ES_{MIN\,DS}$) thereof.

8. The system of claim 7 further characterized by a second preference selector (228) for manual selection of delayed automatic upshift initiation and for providing a fourth input signal indicative thereof, said control unit responsive to manual selection of delayed automatic upshift initiation to increase the value of the upshift engine speed value but not above said maximum value ($ES_{MAX\,US}$) thereof.

9. An automated vehicular transmission system comprising a fuel throttle controlled engine (E), a multiple speed change gear transmission (10) having an input shaft (16) and an output shaft (90), a nonpositive coupling drivingly interposed between the engine and the transmission input shaft, a first sensor (11/98/100) for providing a first input signal indicative of engine rotation speed (ES/IS OS*GR), a mode selector (210) for manual selection of transmission operating modes, including a selectable automatic shift initiation mode, and for providing a second input signal indicative of the selected transmission mode, a central processing unit (106) for receiving said input signals and for processing same according to predetermined logic rules to issue command output signals and actuators (112, 70, 96) responsive to said output signals for controlling shifting of said transmission, said system in the automatic shift initiation mode effective to automatically initiate upshifts if sensed engine speed ($ES_S$) is greater than an upshift engine speed value ($ES_{US}$) and to automatically initiate downshifts if sensed engine speed is less than a downshift engine speed value ($ES_{DS}$), said upshift and downshift engine speed values having maximum ($ES_{MAX\,US}$, $ES_{MAX\,DS}$) and minimum ($ES_{MIN\,US}$ and $ES_{MIN\,DS}$) values thereof, said system characterized by:

a second preference selector (228) for manual selection of delayed automatic upshift initiation and for providing a fourth input signal indicative thereof, said control unit responsive to manual selection of delayed automatic upshift initiation to increase the value of the upshift engine speed value but not above said maximum value ($ES_{MAX\,US}$) thereof.

10. The system of claims 1, 5, 7 or 9 wherein said transmissions are mechanical transmissions.

11. The system of claims 2, 4, 5, 6, 8 or 9 wherein said engine speed values are increased by about 150 RPM.

12. The system of claims 1, 2, 3, 4, 6, 7 or 8 wherein said engine speed values are decreased by about 150 RPM.

13. The system of claims 6, 8 or 9 wherein said controller is effective to establish a default upshift engine speed value (240) intermediate said minimum and maximum values thereof and said system is effective to increase said upshift engine speed value from said intermediate to said maximum value thereof and from minimum value to said default value thereof.

14. The system of claim 4 wherein said controller is effective to establish a default upshift engine speed value (240) intermediate said minimum and maximum values thereof and said system is effective to increase said upshift engine speed value from said intermediate to said maximum value thereof and from minimum value to said default value thereof.

15. The system of claim 14 wherein said system is effective to decrease said upshift engine speed value from said default value to said minimum value thereof and from said maximum value to said default value thereof.

16. The system of claims 2, 5 or 6 wherein said controller is effective to establish a default downshift engine speed value (242) intermediate said minimum and maximum values thereof and said system is effective to increase said downshift engine speed value from said default value to said maximum value thereof and from minimum value to said default value thereof.

17. The system of claim 4 wherein said controller is effective to establish a default downshift engine speed value (242) intermediate said minimum and maximum values thereof and said system is effective to increase said downshift engine speed value from said default value to said maximum value thereof and from minimum value to said default value thereof.

18. The system of claim 17 wherein said system is effective to decrease said downshift engine speed value from said default value to said minimum value thereof and from said maximum value to said default value thereof.

19. The system of claim 13 wherein said maximum upshift engine value is equal to the last shift downshift offset value thereof.

20. An automated vehicular transmission system comprising a fuel throttle controlled engine (E), a multiple speed change gear mechanical transmission (1 0) having an input shaft (16) and an output shaft (90), a friction clutch drivingly interposed between the engine and the transmission input shaft, a first sensor (11/98/100) for providing a first input signal indicative of engine rotation speed (ES/IS/OS*GR), a mode selector (210) for manual selection of transmission operating modes, including a manual shift initiation mode (H) and an automatic shift initiation mode (D), and for providing a second input signal indicative of the selected transmission mode, an upshift/downshift selector (226/228) for selecting manual initiation of upshifts and downshifts, respectively, in the manual shift initiation mode and for providing third and fourth input signals, respectively indicative of the direction of manually selected shift, a central processing unit (106) for receiving said input signals and for processing same according to predetermined logic rules to issue command output signals and actuators (112, 70, 96) responsive to said output signals for controlling shifting of said transmission, said system in the automatic shift initiation mode effective to automatically initiate upshifts if sensed engine speed ($ES_S$) is greater than an upshift engine speed value ($ES_{US}$) and to automatically initiate downshifts if sensed engine speed is less than a downshift engine speed value ($ES_{DS}$), said upshift and downshift engine speed values having maximum ($ES_{MAX\,US}$, $ES_{MAX\,DS}$) and minimum ($ES_{MIN\,US}$ and $ES_{MIN\,DS}$) values thereof, said system characterized by:

means effective in said automatic shift initiation mode responsive to manual selection of an upshift initiation to decrease the value of the upshift and downshift engine speed values but not below said minimum values ($ES_{MIN\ US}$ and $ES_{MIN\ DS}$) thereof and responsive to manual selection of a downshift initiation to increase the values of the upshift and downshift engine speed values but not above said maximum values ($ES_{MAX\ US}$) and ($ES_{MAX\ US}$) thereof.

21. The system of claim 20 wherein said engine speed values are increased by about 150 RPM.

22. The system of claim 20 wherein said engine speed values are decreased by about 150 RPM.

23. The system of claim 20 wherein said controller is effective to establish a default upshift engine speed value (240) intermediate said minimum and maximum values thereof and said system is effective to increase said upshift engine speed value from said default value to said maximum value thereof and from minimum value to said default value thereof.

24. The system of claim 23 wherein said system is effective to decrease said upshift engine speed value from said default value to said minimum value thereof and from said maximum value to said default value thereof.

25. The system of claims 23 or 24 wherein, after a predetermined period of time after receipt of said third or fourth input signal, said engine speed values will assume said default values thereof.

26. The system of claims 23 or 24 wherein, if after engine speed equals a reference value after receipt of said third or fourth input signal, said engine speed values will assume said default values thereof.

27. The system of claim 20 wherein said system, in the manual shift initiation mode, includes means responsive to (i) a selection of a shift from a currently engaged ratio or from neutral into a selected target ratio and (ii) confirmation of a transmission neutral condition for (i) sensing and storing the then current vehicle speed as an initial vehicle speed $VS_i$ (ii) and thereafter sensing substantial synchronization of the transmission and (iii) thereafter for issuing command output signals to said actuator to enable the transmission to be shifted into the selected target ratio; said means sensing substantial synchronization of said transmission by comparing said first signal to a reference range determined as a function of said selected target ratio and said second signal.

* * * * *